United States Patent [19]

Brinkmann

[11] 4,067,524
[45] Jan. 10, 1978

[54] ENGINE MOUNT

[75] Inventor: Dale C. Brinkmann, East Peoria, Ill.

[73] Assignee: Caterpillar Tractor Co., Peoria, Ill.

[21] Appl. No.: 704,218

[22] Filed: July 12, 1976

[51] Int. Cl.² ............................................. F16M 5/00
[52] U.S. Cl. ..................................... 248/9; 180/64 R
[58] Field of Search ...................... 248/9, 10, 5, 15, 18, 248/22, 24, 26; 287/85 R; 267/153; 180/64 R

[56] References Cited

U.S. PATENT DOCUMENTS

| | | | |
|---|---|---|---|
| 1,694,756 | 12/1928 | Short | 248/9 |
| 1,881,777 | 10/1932 | MacPherson | 248/10 |
| 2,011,235 | 8/1935 | Trott | 248/7 X |
| 2,351,427 | 6/1944 | Henshaw | 248/358 R X |
| 2,925,974 | 2/1960 | Aebersold et al. | 248/9 |
| 3,633,856 | 1/1972 | Crews | 248/9 |
| 3,770,231 | 11/1973 | Kirchgessner | 248/9 |

FOREIGN PATENT DOCUMENTS

| | | | |
|---|---|---|---|
| 223,233 | 2/1962 | Austria | 248/9 |
| 478,868 | 1/1938 | United Kingdom | 248/9 |

Primary Examiner—J. Franklin Foss
Attorney, Agent, or Firm—Phillips, Moore, Weissenberger, Lempio & Majestic

[57] ABSTRACT

A bushing assembly employed in an engine mount comprises a cup-shaped outer housing, a cup-shaped inner housing having an engine support trunnion mounted therein, and an annular elastomeric bushing compressed between the cylindrical side walls of the outer and inner housings. An elastomeric pad is interposed between an end wall of the outer housing and an end wall of the inner housing to substantially absorb axially directed loads imposed thereon by the trunnion. Air openings are provided for facilitating assembly in the first embodiment in the outer housing and pad and in the second embodiment in the inner housing. In the second embodiment, the pad is spaced from the end wall of the inner housing and further includes a radially directed rib on the inner housing positioned to contact the annular member so as to assist in damping axial movement.

8 Claims, 3 Drawing Figures

U.S. Patent
Jan. 10, 1978
4,067,524
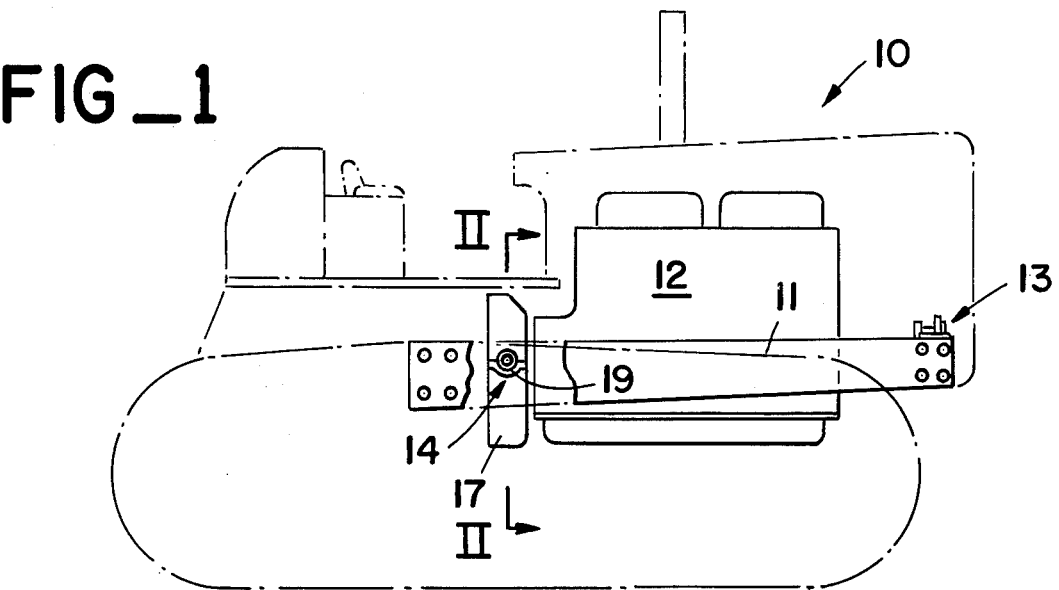
FIG_1
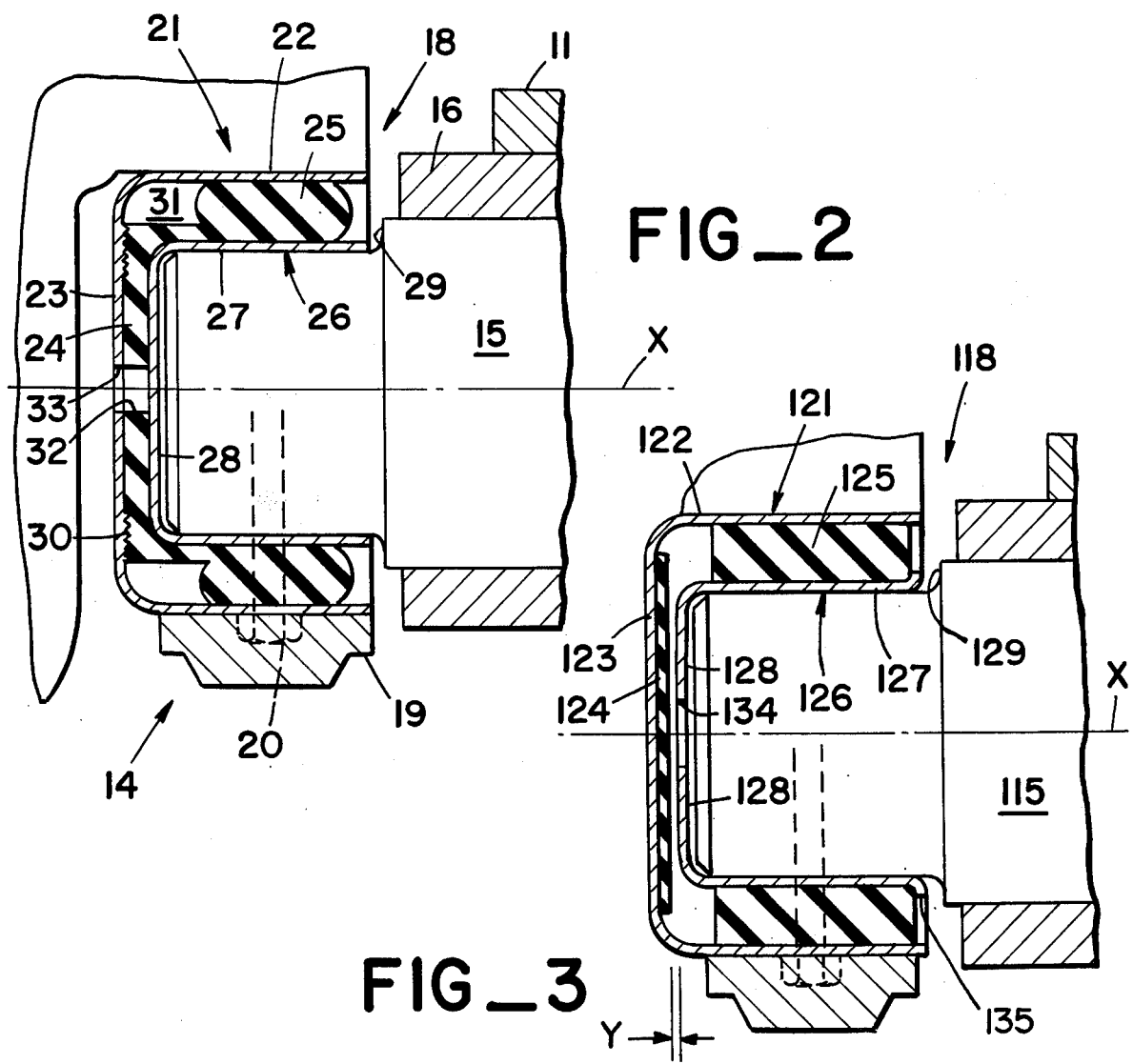
FIG_2
FIG_3

ENGINE MOUNT

BACKGROUND OF THE INVENTION

This invention relates to a bushing assembly employed in an engine mount. More particularly, this invention relates to an improved bushing assembly having a pair of nesting, cup-shaped housings.

A typical three-point engine support system comprises a pair of trunnions positioned on opposite sides of the engine for mounting the aft end thereof on a vehicle frame. Since the engine mount for each trunnion is subjected to dynamic forces during vehicle operation, a rubber support bushing is normally utilized therein to deter the transmission of such forces from the frame to the engine. Although the support bushing substantially absorbs forces acting radially relative to the trunnion, the bushing does not adequately isolate forces transmitted axially therealong.

Since the rubber bushing is structurally weaker and exhibits a lower spring rate in shear than in compression, the engine tends to become displaced transversely relative to the frame to induce engine drive train misalignment problems. As a result, the engine, flywheel housing and associated drive train components are severely stressed and are thus prone to failure. Such engine displacement further creates vibrational forces and associated noise, due to the metal-to-metal contact occurring between the support trunnion and the vehicle frame.

One solution to the above-cited problems is found in U.S. Pat. No. 3,770,231 to Kirchgessner et al, assigned to the Assignee hereof. However, certain difficulties may be encountered in assembling the tight fitting components in that a block or lock effect can be encountered when air is trapped within the space defined by the tight fitting components.

SUMMARY AND OBJECTS OF THE INVENTION

The invention takes the form of an improved bushing assembly particularly adapted for use in engine mounts to limit transverse displacement of the engine relative to the vehicle frame and to substantially reduce the transmission of vibrational forces and associated noise between the engine and vehicle frame.

In the preferred embodiment of the invention, the bushing assembly comprises an outer and inner cup-shaped housing having an annular elastomeric bushing compressed therebetween. In addition, an elastomeric pad is interposed between the end walls and the inner and outer cup-shaped housings. If the first embodiment, a pad, which may be made of polyurethane, substantially fills the space between the end walls. Openings are provided in the outer housing end wall and in the pad which are in substantial alignment to permit air to pass when the assembly is being put together. Grooves on the inner wall of the outer housing assist in retention of the pad. The pad and annular bushing are conveniently of integral, one-piece construction.

In an alternate embodiment, the air opening is contained within the end wall of the inner cup-shaped member. The inner cup-shaped member end wall is also spaced from the end wall and has a radially directed rib extending from an outer periphery of the open end of the inner housing. The rib abuts the annular bushing so that axial movement is dampened. In an alternate embodiment, the elastomeric bushing and pad are conveniently bonded to the housings at their point of contact.

It is therefore the primary object of this invention to provide an improved bushing assembly.

It is a further object of this invention to provide such an improved bushing assembly which is easily assembled and does not encounter air block.

Other objects and advantages of this invention will become more readily apparent from a review of the accompanying drawings and following description.

BRIEF DESCRIPTION OF THE DRAWINGS

FIG. 1 is a side elevational view of a track type tractor shown in phantom lines, having an engine mount of this invention employed therein;

FIG. 2 is an enlarged sectional view of the engine mount taken in direction of the arrows II—II in FIG. 1; and FIG. 3 is a similar view, but illustrating a second embodiment of the engine mount.

DETAILED DESCRIPTION

Referring to FIG. 1, a track-type tractor 10 comprises a frame 11 having an engine 12 supported thereon by three engine mounts disposed in triangular relationship with respect to each other. A first engine mount 13 similar to that disclosed in U.S. Pat. No. 3,633,856, assigned to the assignee of this application, is provided at the front, longitudinal center of the engine. Second and third identical engine mounts 14 (one shown) are provided at the rear of the engine and on opposite, transverse sides thereof.

As best shown in FIG. 2, each engine mount 14 comprises a cylindrical support member or trunnion 15, disposed on an axis X which is perpendicular to the longitudinal centerline of the vehicle. A first end of the trunnion is secured to frame 11 by a bracket 16 whereas a second end, having a reduced diameter, mounts a flywheel housing 17 of the engine thereon by a bushing assembly 18. The bushing assembly may be attached to the flywheel housing by a bushing cap 19 and two bolts 20.

Each bushing assembly comprises a cup-shaped outer housing 21, having a cylindrical side wall 22 integrally formed with a transversely disposed and substantially flat end wall 23. A flat, circular elastomeric pad 24 is secured as by binding to the inner face of the end wall. The end wall and pad cooperate to provide a hereinafter more fully described combined thrust limiting and damping means at one end of the bushing assembly. The pad may conveniently be of polyurethane plastic material.

An annular elastomeric bushing 25 is compressed between outer housing 21 and a cup-shaped inner housing 26. The bushing is preferably compressed between side wall 22 of outer housing 21 and side wall 27 of inner housing 26 in the manner described in U.S. Pat. No. 3,633,856 aforementioned. Cylindrical side wall 27 of the inner housing is integrally formed with a transversely disposed, substantially flat end wall 28.

The assembled bushing assembly is preferably mounted on trunnion 15 so that the open, peripheral end of the inner housing 26 does not axially abut the flange portion 29 of trunnion 15. Rather, the free end of the trunnion 15 abuts the end wall 28.

Concentric grooves 30 of the inner face of wall 23 serve to help retain pad 24 in position. Pad 24 in annular bushing 25 may conveniently be of integral, one-piece construction, as shown, and defining an annular space 31. An opening 32 in pad 24 in alignment with a similar opening 33 in end wall 23 allows the escape of air when the components of the bushing assembly are put together. In this manner, air block is avoided.

Turning to FIG. 3, there is shown a second embodiment of the invention (corresponding constructions are referenced by like numerals, with the additon of the integer "1"). With this embodiment, an opening 134 is contained in the end wall 128 of inner housing 126. It should also be noted that pad 124 is disk-shaped and of a diameter substantially equal to the inner diameter of outer cup-shaped housing 121. Pad 124 is bonded to wall 123 and spaced a distance Y from wall 128 of inner housing 126. A generally radially directed rib 135 is formed on the outer periphery at the open end of housing 126. Rib 135 is spaced from the inner wall of outer housing 121 and abuts bushing 125 so that axial movement thereof in direction of axis X is impeded or dampened by the bushing. It may be recalled that the bushing is bonded to both outer and inner housings 121, 126, respectively.

In operation, elastomeric member 125 compensates for limited radial displacement of inner housing 126 onto the outer housing 121. However, such member will not adequately absorb shearing loads imposed thereon in the direction of axis X.

Such loads are most prevalent when tractor 10 is operated on a slope or uneven terrain which tends to displace engine 12 laterally with respect to frame 11 as best seen in FIG. 1. The bushing assembly of this invention, comprising the above-described thrust limiting and damping means limits such lateral engine displacement. In the embodiment of FIG. 3, the thrust limiting and damping means limits the lateral engine displacement to clearance Y which is substantially less than the shear limit of bushing 125. In addition, an elastomeric pad 124 functions to cushion the impact at the end of trunnion 115 on end walls 123 and 128. The pads thus dampen vibrational forces and the accompanying noise normally transmitted between the engine and the vehicle frame. In the embodiment of FIG. 2, there is no distance Y, and impact is continuously absorbed by pad 24.

While the invention has been described and shown with particular reference to the preferred embodiment, it will be apparent that variations might be possible which fall within the scope of the present invention, which is not to be limited except as defined by the following claims.

I claim:

1. In an engine mount comprising a bushing assembly mounted between an engine and a support trunnion secured to a vehicle frame, wherein said bushing assembly comprises a cup-shaped outer housing having an end wall spaced inwardly from an adjacent wall of said engine, a cup-shaped inner housing having an end wall spaced inwardly from said outer housing end wall so as to define an included space, said inner housing being mounted on said trunnion, an annular elastomeric bushing compressed between a cylindrical side wall of said outer housing and a cylindrical side wall of said inner housing and an elastomeric pad abutting said outer housing end wall and positioned between said inner housing end wall for substantially absorbing impact loads imposed thereon by axial engagement with the end of said support trunnion, further including means defining an opening in a housing end wall of said bushing assembly intercommunicating said included space with atmosphere thereby facilitating assembly of said housings into said bushing assembly.

2. The invention of claim 1 wherein said pad is spaced from said end wall of said inner housing.

3. The invention of claim 1 wherein said pad is substantially disk shaped and defines an outer diameter substantially equal to the inner diameter of said outer housing.

4. The invention of claim 1 wherein said pad substantiallly fills the space between said outer housing end wall and said inner housing end wall.

5. The invention of claim 1 further including means defining an opening in said pad in substantial alignment with said means defining an opening in said outer housing end wall to further facilitate assembly.

6. The invention of claim 1 wherein said cup-shaped inner housing defines an axis and an open end, and further including a generally radially directed rib on said open end.

7. The invention of claim 6 wherein the radially outermost part of said rib is spaced from said cylindrical side wall of said outer housing.

8. The invention of claim 7 wherein said annular elastomeric bushing is in contacting relation with said rib.

* * * * *